United States Patent [19]

Kalahasthy et al.

[11] Patent Number: 5,586,792
[45] Date of Patent: Dec. 24, 1996

[54] QUICK CONNECTOR WITH INTEGRAL RELEASE MECHANISM

[75] Inventors: Gopichand Kalahasthy, Clinton Township; James R. Zinke, II, Sterling Heights, both of Mich.

[73] Assignee: Bundy Corporation, Warren, Mich.

[21] Appl. No.: 391,138

[22] Filed: Feb. 21, 1995

[51] Int. Cl.⁶ ........................................... F16L 37/14
[52] U.S. Cl. ........................... 285/319; 285/313; 285/305
[58] Field of Search ..................... 285/3, 93, 305, 285/308, 313, 319

[56] References Cited

U.S. PATENT DOCUMENTS

| | | |
|---|---|---|
| 933,561 | 9/1909 | Hebert . |
| 2,021,241 | 11/1935 | Mall . |
| 2,092,243 | 9/1937 | Breese .................................... 285/305 |
| 2,772,898 | 12/1956 | Seeler . |
| 2,899,215 | 8/1959 | Ardito . |
| 3,314,696 | 4/1967 | Ferguson et al. . |
| 3,428,340 | 2/1969 | Pelton . |
| 3,450,424 | 6/1969 | Calisher . |
| 3,527,485 | 9/1970 | Goward et al. . |
| 3,538,940 | 11/1970 | Graham . |
| 3,625,551 | 12/1971 | Branton . |
| 3,753,582 | 8/1973 | Graham . |
| 4,218,979 | 8/1980 | Esposito et al. . |
| 4,234,262 | 11/1980 | Nakai et al. . |
| 4,244,608 | 1/1981 | Stuemky . |
| 4,344,516 | 8/1982 | Kolb . |
| 4,423,892 | 1/1984 | Bartholomew . |
| 4,537,427 | 8/1985 | Cooke . |
| 4,541,657 | 9/1985 | Smyth . |
| 4,561,682 | 12/1985 | Tisserat .................................... 285/305 |
| 4,632,436 | 12/1986 | Kimura .................................... 285/305 |
| 4,772,052 | 9/1988 | Morain . |
| 4,813,716 | 3/1989 | Lalikos et al. . |
| 4,869,534 | 9/1989 | Ketcham et al. . |
| 4,884,829 | 12/1989 | Funk et al. . |
| 5,000,614 | 3/1991 | Walker et al. . |
| 5,269,571 | 12/1993 | Haggard . |
| 5,356,183 | 10/1994 | Cole .................................... 285/305 |
| 5,374,088 | 12/1994 | Moretti et al. .................................... 285/305 |
| 5,452,924 | 9/1995 | Kujawski .................................... 285/308 |

FOREIGN PATENT DOCUMENTS

| | | | |
|---|---|---|---|
| 593937 | 4/1994 | European Pat. Off. ................ | 285/305 |
| 1080178 | 12/1954 | France . | |
| 1294438 | 4/1962 | France . | |
| 1396434 | 3/1965 | France .................................... | 285/305 |
| 2028711 | 12/1971 | Germany . | |
| 5-196185 | 8/1993 | Japan . | |
| 6050483 | 2/1994 | Japan . | |
| 398217 | 2/1966 | Switzerland . | |

*Primary Examiner*—Eric K. Nicholson
*Attorney, Agent, or Firm*—Dorn, McEachran, Jambor & Keating

[57] ABSTRACT

A quick connector coupling for a fluid line includes a hollow female connector body which receives a tubular male member with a raised annular upset. A retainer is demountably coupled to the connector body. The retainer includes two spaced beams which extend through slots in the connector body from a cross member postioned outside of the connector body. The beams are positioned between the upset and an end of the connector body, and have a relaxed spacing less than the upset diameter such that the male member is secured in the connector body. A release protrusion projects from each retainer beam between the cross member and the connector body. The release protrusions have cam surfaces cooperable with an external surface of the connector body to spread the retainer beams apart when the cross member is pressed toward the connector body.

11 Claims, 2 Drawing Sheets

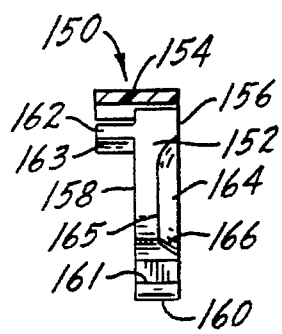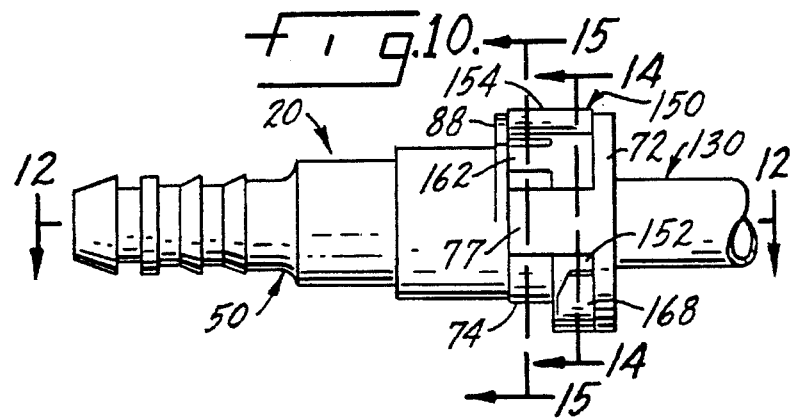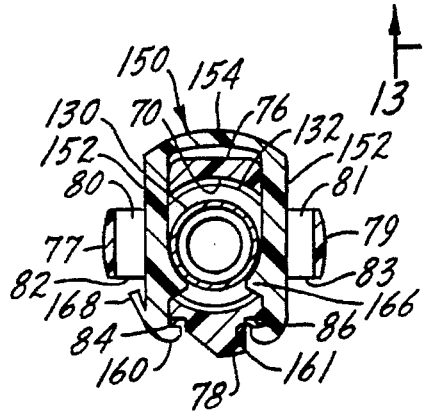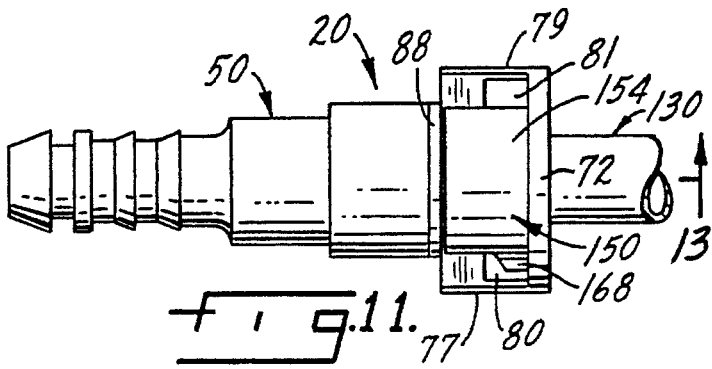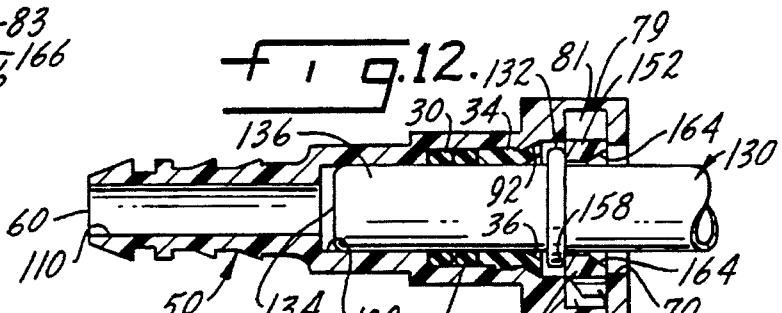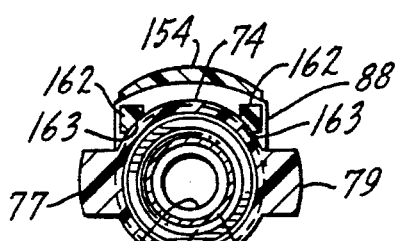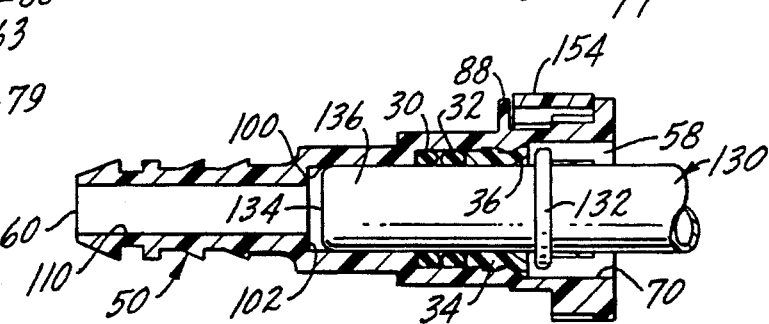

5,586,792

QUICK CONNECTOR WITH INTEGRAL RELEASE MECHANISM

BACKGROUND OF THE INVENTION

This invention relates to fluid line systems which include quick connector couplings, and more particularly to a quick connector coupling having an integral release mechanism which allows for quick separation of the coupling.

In automotive and other fields, quick connector couplings, which generally include a male member received and sealingly retained in a female connector body, are often utilized to provide a fluid connection between two components or conduits, thus establishing a fluid line between the two components. Use of quick connector couplings is advantageous in that a sealed and secured fluid line may be established with a minimum amount of time and expense.

A number of methods and mechanisms exist for securing the male member and female connector body of a quick connector coupling together. One retention mechanism involves the use of a retainer disposed within the connector body. The retainer has load-bearing members extending between a radial face formed within the connector body and an enlarged upset formed on the male member, thereby securing the male member within the connector body. One drawback of this type of retainer is that separation of the coupling is usually difficult to attain. A special release tool or sleeve is often required to disconnect the joint.

Another type of retention mechanism involves use of a retainer in the form of a retention clip inserted through slots formed in the exterior of the connector body. The present invention is directed to this type of retainer. Beams extending through the slots are poised between the male member upset and the entrance to the connector body, thereby preventing disconnection of the coupling. Due to the physical appearance of such retainers, they are referred to in the trade as "hairpin" or "horseshoe" retainers. A good example of this type of retainer is found in U.S. Pat. No. 4,869,534, issued to M. Ketcham and D. Walker, which is herein incorporated by reference.

As with other types of retainers, a primary concern in the design of "horseshoe" retainers is a mechanism which permits easy release of the coupling without significantly increasing the complexity of the coupling. A release mechanism which does not add extra parts or significantly increase the size of the coupling is desirable. Furthermore, the release mechanism should increase the chances for accidental disconnection as little as possible.

The quick connector coupling of the present invention provides a release mechanism which addresses these concerns.

SUMMARY OF THE INVENTION

The present invention provides a quick connector coupling for forming a joint in a fluid line system. It includes a female connector body having a generally cylindrical exterior wall with slots formed therethrough. A through bore extending from an end of the connector body.

A male member extends through the end of the connector body and into the bore. The male member has a tubular surface and an annular upset, with the upset having a greater diameter than the diameter of the tubular surface.

A retainer is demountably coupled to the connector body. The retainer includes two spaced beams extending through the slots and positioned between the male member upset and the connector body end. The beams are movable between a locked position in which they are spaced apart a distance greater than the diameter of the male member tubular surface but less than the diameter of the upset, and a release position in which the beams are spaced apart a distance greater than the upset diameter.

Integral release means are associated with the retainer. The release means are cooperable with the exterior wall of the connector body to move the retainer beams from the locked position to the release position.

BRIEF DESCRIPTION OF THE DRAWINGS

FIG. 9 is a sectional view of the retainer of FIG. 8, taken through line 9—9;

FIG. 10 is a side elevation view of the quick connector coupling of the present invention;

FIG. 11 is a top plan view of the quick connector coupling of FIG. 10;

FIG. 12 is a sectional view of the quick connector coupling of FIG. 10, taken through line 12—12;

FIG. 13 is a sectional view of the quick connector coupling of FIG. 11, taken through line 13—13;

FIG. 14 is a sectional view of the quick connector coupling of FIG. 10, taken through line 14—14; and FIG. 15 is a sectional view of the quick connector coupling of FIG. 10, taken through line 15—15.

DETAILED DESCRIPTION OF THE PREFERRED EMBODIMENTS

Figure 1:
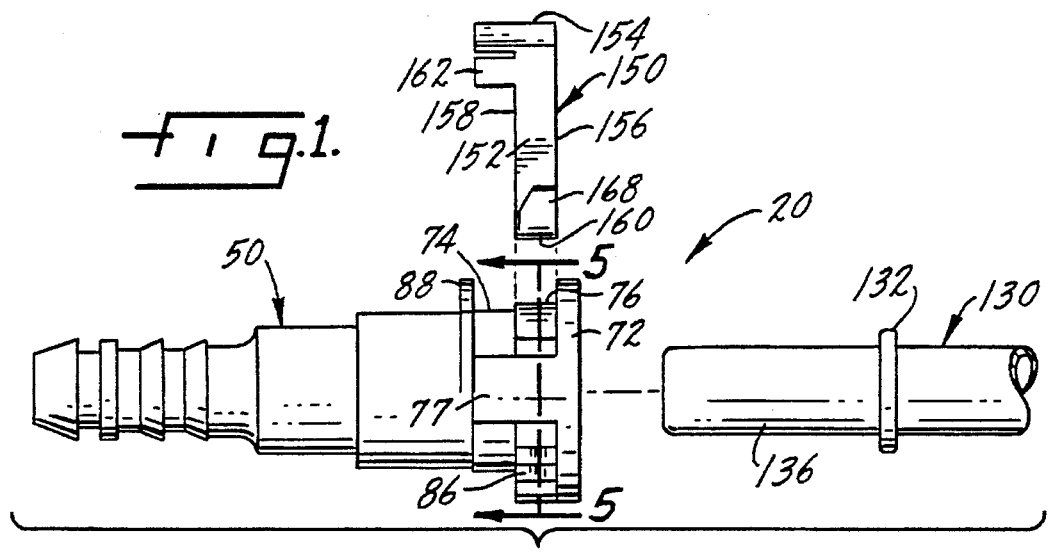
FIG. 1 is an exploded view of a quick connector coupling according to the present invention.
Figure 2:
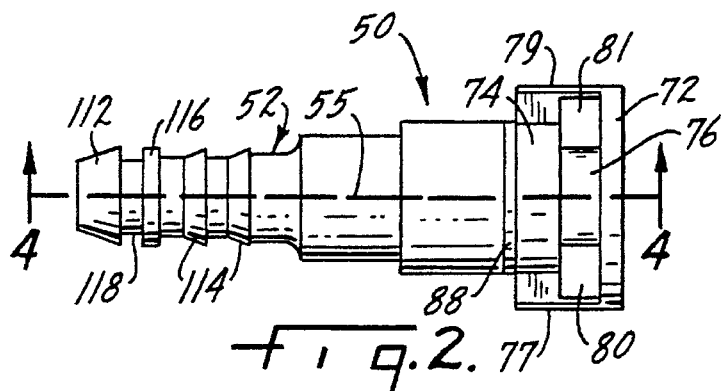
FIG. 2 is a top elevation view of a female connector body which forms a part of the quick connector coupling.
Figure 3:
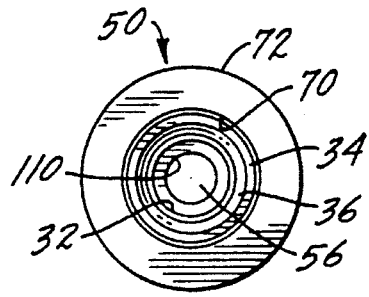
FIG. 3 is an end view of the connector body.
Figure 4:
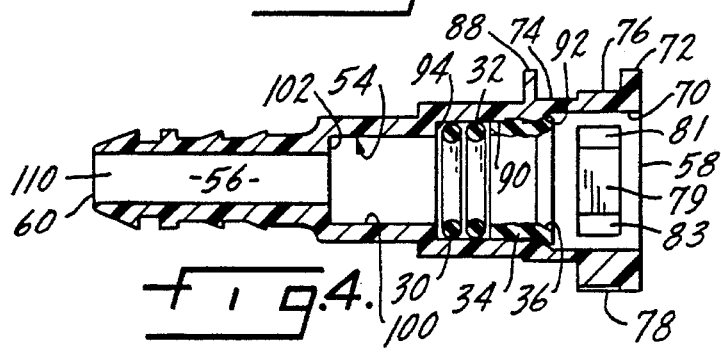
FIG. 4 is a sectional view of the connector body of FIG. 3, taken through line 4—4.

A quick connector coupling 20 formed in a fluid line is comprised of a generally cylindrical female connector body 50 and a male member 130 secured together by a retainer 150. Male member 130 is formed at an end of a hollow tube which forms a part of a fluid line system. In use, female connector body 50 is connected to flexible tubing or hose (not shown) which is also a part of the fluid line system. Female connector body 50 and male member 130 are connectable to form a permanent, but severable, joint in the fluid line.

Connector body 50 is illustrated in detail in FIGS. 1–4. Connector body 50 is defined by a generally cylindrical, stepped exterior wall 52 and a generally cylindrical, stepped interior wall 54. Connector body 50 is centered about an axis 55, and is preferably made of a plastic material, such as nylon-12. Interior wall 54 defines a through bore 56. Bore 56 extends completely through connector body 50, from a larger diameter, male member reception end 58 to a smaller diameter, hose connection end 60.

Description of this invention necessarily involves description of the relative positioning and/or movement of various elements of the coupling. Throughout this specification and the claims which follow, the terms "inward" or "insertion" denote an axial movement, or relative position, away from male member reception end 58 and towards hose connection end 60. The terms "outward" or "pull-back" denote an axial movement, or relative position, towards male member reception end 58 and away from hose connection end 60. Hence, "inward movement", or "insertion", of the male member denotes male member movement towards the hose connection end of the connector body, whereas a "pull-back" on the male member is an attempt to withdraw the male member from the connector body.

Variations in the diameter of interior wall 54 of connector body 50 divide bore 56 into four distinct sections. Moving inward from male member reception end 58, they are: retainer housing section 70, seal chamber 90, tube end receptacle 100, and fluid passageway 110.

Retainer housing section 70 is formed adjacent male member reception end 58. It is defined by an outer annular rim 72 connected to an inner annular rim 74 by top support member 76, bottom support member 78, and side support members 77 and 79. Support members 76–79 are equidistantly spaced around connector body 50. The spaces between support members 76–79 define top retainer slots 80 and 81, and bottom retainer slots 82 and 83. Slots 80–83 are provided to receive and position retainer 150 transversely to central axis 55 of connector body 50.

Figure 5:
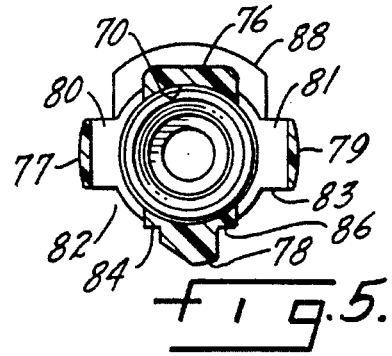
FIG. 5 is a sectional view of the connector body of FIG. 1, taken through line 5—5.
Figure 7:
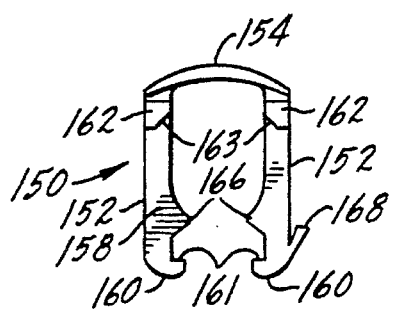
FIG. 7 is an elevation view of the retainer of FIG. 6, as viewed from the left.

Locking shoulders 84 and 86 are defined on bottom support member 78 (FIG. 5). A raised, semi-annular shield 88 is formed adjacent inner rim 74 opposite top support member 76. Shield 88 extends circumferentially between side support members 77 and 79.

Seal chamber 90 is formed inward of retainer housing section 70. It is defined by a reduced diameter portion of wall 54, relative to retainer housing section 70, extending inward from a conical shoulder 92 to a radial shoulder 94. Seal chamber 90 is provided to house sealing elements to form a fluid seal between connector body 50 and male member 130.

Tube end receptacle 100 is formed inward of seal chamber 90. It is defined by a reduced diameter portion of wall 54, relative to seal chamber 90, which extends inward from the small diameter end of radial shoulder 94 to a radial shoulder 102. Tube end receptacle 100 is provided to receive an open end of male member 130.

Fluid passageway 110 is defined by the smallest diameter portion of interior wall 54. It leads from the small diameter end of radial shoulder 102 to hose connection end 60.

The portion of exterior wall 52 surrounding fluid passageway 110 is configured to facilitate connection to another component in the fluid line. The illustrated connector body 50, for example, is specially formed for connection to a flexible hose. A conical nose 112 is formed adjacent end 60 to facilitate insertion into a flexible hose, and ramped barbs 114 are formed outward of nose 112 to retain the hose on the connector body. An annular flange 116 spaced from nose 112 defines a groove 118. Groove 118 may house an exterior O-ring seal, if desired.

Alternative exterior configurations could be employed around the fluid passageway end of connector body 50 for connection to other system arrangements. Threads, for example, could be formed in exterior wall 52 to facilitate connection within a threaded bore of a housing containing a system component.

Retainer 150 is illustrated in detail in FIGS. 6–9. It is preferably made of a resilient, flexible material, such as plastic. Retainer 150, which extends through slots 80–83 of retainer housing section 70, is demountably coupled to connector body 50.

Retainer 150 includes a pair of elongated, generally parallel beams 152 extending from, and joined at one end by, a cross member 154. Cross member 154 provides a separation between the beams approximately equal to the diameter of male member 130. Beams 152 have an axial width approximately equal to, but slightly less than (to allow clearance), the axial width of slots 80–83. As is best seen in FIG. 14, the lateral width of beams 152 is significantly less than the lateral width of slots 80–83, in order to allow outward expansion of beams 152 (to permit male member insertion and release).

Figure 6:
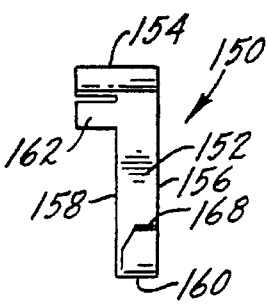
FIG. 6 is a side elevation view of a retainer which forms a part of the quick connector coupling.
Figure 8:
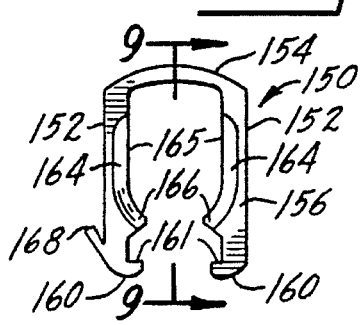
FIG. 8 is a side elevation view of the retainer of FIG. 6, as viewed from the right.

Cross member 154 has an axial width substantially greater than that of beams 152. As best seen in FIGS. 6 and 9, cross member 154 is axially aligned with the front faces 156 of beams 152, but extends axially beyond the rear faces 158 of beams 152. Cross-member 154 is formed with a slightly arcuate cross-section to provide enhanced flexibility.

Each retainer beam 152 includes a latch 160 formed at an end remote from cross member 154, a release protrusion 162 formed on rear face 158 at an end adjacent cross member 154, and a sloping lead area 164 formed on front face 156 between latch 160 and cross member 154.

When retainer 150 is fully inserted into connector body 50, latches 160 lock retainer 150 into position relative to connector body 50 (see FIG. 14). Latching edges 161 defined by latches 160 engage locking shoulders 84 and 86 defined by bottom support member 78 to lock retainer 150 in place.

Release protrusions 162 protrude from the rear face of each retainer beam 152, just below cross member 154. Protrusions 162 extend axially from beams 152 a distance equal to the distance by which cross member 154 extends axially from beams 152 (FIGS. 6 and 9). Of critical importance are ramped, or camming, surfaces 163 formed on each protrusion 162. When assembled, release protrusions 162, and in particular, ramped surfaces 163, rest just above inner annular rim 74 of connector body 50. If pressure is applied to cross member 154 (FIG. 15) to press retainer 150 further into connector body 50, ramped surfaces 163 contact and slide or cam against annular rim 74. Consequently, retainer beams 152 spread apart, allowing release of male member 130.

Lead areas 164 slope radially and axially inwardly from front face 156 of each retainer beam 152 (FIG. 8), and terminate approximately midway between front face 156 and rear face 158 (FIG. 9). The spacing between lead areas 164 is at its greatest adjacent front face 156. Here, the spacing is approximately equal to the diameter of upset 132 formed on male member 130. Moving from front face 156 toward rear face 158, the spacing between lead areas 164 steadily decreases. At rear edges 165 of lead areas 164, the spacing between the lead areas is approximately equal to the nominal (non-upset) diameter of male member 130. The portions of lead areas 164 closer to latches 160 curve inwardly at 166 to match the annular profile of male member upset 132. This assists in guidance and centering of male member 130 through connector body 50.

Upon initial contact with retainer beams 152, upset 132 can be pushed inwardly between beams 152 upon application of sufficient force, since the spacing between front faces 156 of beams 152 (in the lead areas) is equal to the diameter of upset 132. As inward movement of upset 132 progresses, retainer beams 152 are steadily spread apart, since the spacing between lead areas 164 steadily decreases. Once upset 132 has moved fully past beams 152, beams 152 snap back into place behind upset 132, locking male member 130 into connector body 50.

Since there are no lead areas formed in the rear faces 158 of retainer beams 152, and the spacing between beams 152 at rear faces 158 is less than the diameter of upset 132, attempted outward movement of male member 130 does not spread beams 152 to permit release of member 130. Male member 130 can move freely past retainer beams 152 in an insertion direction only. Once fully inserted, male member 130 can be removed from connector body 50 only by pressing down on cross member 154 of retainer 150 such that release protrusions 162 engage and slide against the exterior surface of connector body 50, spreading retainer beams 152 apart (FIG. 15).

A frangible, angled catch 168 is formed on the exterior of one retainer beam 152 just above latch 160. Catch 168 resists removal of retainer 150 from connector body 50, once it is assembled. To remove retainer 150, beams 152 must be spread apart a distance such that latches 160 disengage locking shoulders 84 and 86 of bottom support member 78. Spreading the beams apart this distance, however, will cause catch 168 to hook the bottom edge of side support member 77 (or 79) and provide an initial resistance to further attempts to remove retainer 150. Since catch 168 is frangible, however, application of sufficient force will cause catch 168 to break off of beam 152, and permit removal of retainer 150 from connector body 50. The absence of catch 168 will be a signal or indicator that retainer 150 has, at sometime, been removed. It should be noted that catch 168, due to the angle at which it extends from beam 152, resists withdrawl of retainer 150 from connector body 50, but does not hinder installation of retainer 150 into body 50.

Male member 130, typically formed at the end of a rigid tube, is received in connector body 50. It includes a radially enlarged upset 132 formed a given distance from an open tube end 134. Tube end 134 is typically rounded or tapered to make insertion of male member 130 into connector body 50 less difficult. A smooth, cylindrical sealing surface 136 extends between upset 132 and tube end 134. The nominal (non-upset) outer diameter of male member 130 should be such that the end of male member 130 fits snugly within tube end receptacle 100.

Disposed within seal chamber 90 are O-ring seals 30 and 32. O-rings 30 and 32 are sized to fit tightly within seal chamber 90 and tightly around sealing surface 136 of male member 130. If desired, O-rings 30 and 32 could be separated by a rigid spacer ring. O-rings 30 and 32 are preferably made of fluorocarbon or of toughened fluorosilicone.

O-rings 30 and 32 are secured in chamber 90 by a hollow spacer sleeve 34. Spacer sleeve 34 has a conically enlarged end 36 which seats against conical shoulder 92 of interior wall 54, positioning sleeve 34 within bore 56. To provide enhanced securement of spacer sleeve 34 within bore 56, a raised annular portion may be formed in the outer periphery of sleeve 34, and a corresponding annular recess formed in interior wall 54. The raised spacer portion would be matingly received in the recess formed in interior wall 54 to lock sleeve 34 into place.

Spacer sleeve 34 performs several important functions. It retains the seal elements within seal chamber 90 in a relatively fixed position and prevents their escape from bore 56. Also, the inner diameter of sleeve 34 approximates the nominal outer diameter of male member 130, minimizing potentially debilitating radial movement of male member 130 relative to connector body 50. Finally, the enlarged end 36 of spacer sleeve 34 limits inward movement of male member 130.

Prior to insertion of male member 130 into connector body 50, retainer 150 is attached to connector body 50. Retainer beams 152, latches 160 first, are inserted through top slots 80 and 81 of retainer housing section 70. Retainer 150 should be oriented such that cross member 154 and release protrusions 162 are positioned above inner annular rim 74, and lead areas 164 of beams 152 face male member reception end 58.

Passage of beams 152 through the slots is facilitated by application of downward pressure on cross member 154. Assembly of retainer 150 proceeds, with latches 160 moving through bottom slots 83 and 84. An increase in downward pressure is necessary when latches 160 contact the sides of bottom support 78. With application of sufficient pressure, the rounded ends of latches 160 slide against the sides of support 78, spreading beams 152 apart and allowing latches 160 to pass by support 78. When latches 160 clear bottom support 78, latching edges 161 snap under locking shoulders 84 and 86 of bottom support 78, securing retainer 150 to connector body 50. A properly attached retainer is illustrated in FIG. 14.

Coupling 20 is completed by inserting male member 130 into connector body 50. End 134 of male member 130 passes between retainer beams 152 and into seal chamber 90 with little or no resistance, as the spacing of beams 152 is approximately equal to the nominal diameter of male member 130.

Resistance to insertion occurs when upset 132 contacts retainer beams 152. Lead areas 164 of retainer beams 152 permit passage of upset 132 between beams 152 upon application of sufficient force. As upset 132 passes between beams 152, it rides along lead areas 164, steadily flexing beams 152 outwardly. Once upset 132 has passed, beams 152 spring back into place behind upset 132. Rear faces 158 of beams 152 abut upset 132 to prevent subsequent withdrawl of male member 130 from connector body 50. Male member 130 is in a locked position (FIGS. 10–13).

Spacer 34, along with the diameter reduction occuring in bore 56, prevent further appreciable inward insertion of male member 130 from the locked position. However, as seen in FIG. 12, the spacing between retainer beams 152 and spacer end 36 is sufficient to permit slight axial movement of male member 130 relative to connector body 50. In the locked position, O-rings 30 and 32 form a fluid seal between sealing surface 136 of male member 130 and interior wall 54 of seal chamber 90.

Although it is preferred that retainer 150 be installed prior to insertion of male member 130, it should be noted that these steps could be reversed. Male member would be inserted into connector body 50 until upset 132 contacted spacer 34. Then, retainer 150 would be attached to connector body 50 as described above. If lead areas 164 were eliminated from retainer beams 152, thereby preventing passage of upset 132, this method of installation might be utilized.

Release of male member 130 from a locked position can be achieved only by exerting downward pressure on retainer cross member 154. "Downward pressure" should be understood as a force which will move cross member 154 closer to connector body 50. Typically, this force will be created by a downward thumb press applied to cross member 154 (FIG. 15).

Downward pressure on cross member 154 causes contact between release protrusions 162 (which extend away from beams 152 underneath cross member 154) and inner annular rim 74 of connector body 50. Ramped surfaces 163 of protrusions 162 slide or cam against rim 74, causing beams 152 to spread steadily apart as application of pressure continues. Eventually, beams 152 will be spread apart a distance sufficient to allow passage of upset 132 between beams 152. Male member 130 may then be withdrawn from connector body 50. Upon withdrawal of member 130 from body 150 and relaxation of retainer 150, retainer 150 reassumes its normal installed position.

The retainer/release arrangement for coupling 20 is advantageous in that while retainer 150 "captures" the upset on opposite sides (one retainer beam 152 on each side of the upset), a release force needs to be applied in only one direction. Retainers capturing the tube upset on two sides typically need to be "pushed" in two opposite directions (one for each beam) simultaneously, and often with an external release tool, to effect tube release.

Increasing the simplicity of release creates concern over accidental disconnection of the coupling. Since the retainer of the present invention needs to be pushed in only one direction to effect tube release, factors such as careless handling of the connection or stone impingement (when the connector is utilized in an exposed automobile fluid line) might provide the necessary force to cross member 154 to effect release.

To reduce chances of accidental disconnection, an annular shield 88 has been provided on the exterior of connector body 50. Shield 88 is raised above connector body 50 a distance slightly less than that of cross member 154, and has a curved profile matching that of cross member 154. Shield 88 and outer annular rim 72 of connector body 50 provide vertical barriers on each axial extent of cross member 154. To effect release, therefore, a potential disconnection force must be applied directly (at a ninety degree angle) to the top of cross member 154.

Potential sources of accidental disconnection, such as stray rocks, usually come in at some sort of angle, and thus have a reduced likelihood of causing accidental disconnection with the present arrangement. Careless handling also has reduced potential for accidental disconnection, as the presence of shield 8 and rim 72 virtually make necessary a purposeful downward thumb push applied to the top of cross member 154. Such contact is unlikely to arise during the course of routine handling or inspection.

Various features of the present invention have been explained with reference to the embodiment shown and described. It must be understood, however, that modification may be made without departing from the spirit of the invention and scope of the following claims.

We claim:

1. A quick connector coupling for forming a joint in a fluid line system comprising:

a female connector body having a generally cylindrical exterior wall a through bore extending from an end of said connector body, an outer annular rim adjacent said end of said connector body joined to an inner annular rim by spaced support members, the spacing between said support members defining slots, and a raised semi-annular shield formed on said exterior wall adjacent said inner annular rim;

a male member extending through said end of said connector body and into said bore, said male member having a tubular surface and an annular upset, said upset having a greater diameter than said tubular surface;

a retainer demountably coupled to said connector body, said retainer including two spaced beams extending from a cross member spaced from said exterior wall through said slots and being positioned between said male member upset and said connector body end, said beams having a relaxed spacing less than a diameter of said upset such that said male member is secured in said connector body; and release means associated with said retainer, said release means being cooperable with said exterior wall of said connector body to spread said beams apart a distance greater than said diameter of said upset such that said male member may be withdrawn from said connector body.

2. A coupling as claimed in claim 1 wherein said release means comprise protrusions formed on said retainer beams between said cross member and said exterior wall of said connector body, said protrusions being positioned such that movement of said cross member toward said exterior wall causes said protrusions to contact said exterior wall.

3. A coupling as claimed in claim 2, wherein said protrusions have ramped surfaces which cam against said exterior wall of said connector body when said cross member is moved towards said exterior wall, causing said beams to spread apart.

4. A coupling as claimed in claim 1 wherein latches are formed on ends of said retainer beams remote from said cross member, and locking shoulders are formed on one of said support members, said latches engaging said locking shoulders to demountably couple said retainer to said connector body.

5. A coupling as claimed in 1, wherein sloping lead areas are formed on sides of said retainer beams facing said end of connector body to assist in movement of said upset between said retainer beams.

6. A coupling as claimed in claim 1, wherein said cross member is disposed between said raised shield and said outer annular rim, and said outer annular rim and raised shield have a radial height approximately equal to that of said cross member in order to deflect angular forces away from said cross member.

7. In a quick connector coupling including a hollow female connector body which receives a tubular male member with a raised annular upset, and a retainer demountably coupled to said connector body, said retainer including two spaced beams extending through slots in said connector body from a cross member positioned outside of said connector body, said beams being positioned between said upset and an end of said connector body, and said beams having a relaxed spacing less than a diameter of said upset such that said male member is secured in said connector body, the improvement comprising:

a release protrusion formed substantially perpendicular to and projecting away from a radial face of each retainer beam between said cross member and said connector body, each release protrusion having a cam surface cooperable with an external surface of said connector body when said cross member is pressed toward said connector body to spread said beams apart a distance greater than said diameter of said upset such that said male member may be withdrawn from said connector body.

8. A coupling as claimed in claim 7, and further comprising shield means surrounding said cross member to prevent unintended depression of said cross member.

9. A quick connector coupling for forming a joint in a fluid line system comprising:

- a female connector body having a generally cylindrical exterior wall with slots formed therethrough, and a through bore extending from an end of said connector body;
- a male member extending through said end of said connector body and into said bore, said male member having a tubular surface and an annular upset, said upset having a greater diameter than said tubular surface;
- a retainer demountably coupled to said connector body, said retainer including two spaced beams extending from a cross member spaced from said exterior wall through said slots and being positioned between said male member upset and said connector body end, said beams having a relaxed spacing less than a diameter of said upset such that said male member is secured in said connector body;
- release means associated with said retainer, said release means being cooperable with said exterior wall of said connector body upon depression of said cross member to spread said beams apart a distance greater than said diameter of said upset such that said male member may be withdrawn from said connector body; and
- shield means associated with said connector body and surrounding said cross member to deflect angular forces away from and prevent unintended depression of said cross member.

10. A coupling as claimed in claim 9 wherein said shield means comprises a raised outer annular rim adjacent said end of said connector body joined to an inner annular rim by spaced support members, the spacing between said support members defining said slots, and a raised semi-annular shield formed on said exterior wall adjacent said inner annular rim, said outer annular rim and said shield having a radial height approximately equal to that of said cross member.

11. A coupling as claimed in claim 9 wherein said release means comprises a release protrusion formed perpendicular to and projecting away from each said retainer beam between said cross member and said exterior wall of said connector body, each release protrusion having a cam surface cooperable with said external wall to spread said beams apart when said cross member is depressed.

* * * * *